United States Patent [19]

Najjar et al.

[11] Patent Number: 4,952,380
[45] Date of Patent: * Aug. 28, 1990

[54] PARTIAL OXIDATION PROCESS

[75] Inventors: Mitri Salim Najjar, Hopewell Junction; Roger J. Corbeels, Wappingers Falls, both of N.Y.

[73] Assignee: Texaco Inc., White Plains, N.Y.

[ * ] Notice: The portion of the term of this patent subsequent to May 26, 2004 has been disclaimed.

[21] Appl. No.: 179,931

[22] Filed: Apr. 11, 1988

Related U.S. Application Data

[63] Continuation-in-part of Ser. No. 51,982, May 19, 1987, Pat. No. 4,826,627, and a continuation-in-part of Ser. No. 62,018, Jun. 15, 1987, Pat. No. 4,801,438, and a continuation-in-part of Ser. No. 100,673, Sep. 24, 1987, Pat. No. 4,808,386, and a continuation-in-part of Ser. No. 32,157, Mar. 27, 1987, Pat. No. 4,774,021.

[51] Int. Cl.$^5$ ............... B01D 53/34; C01B 3/36; C10J 3/46; C10J 3/74
[52] U.S. Cl. ................... 423/210; 48/197 R; 48/212; 252/373; 422/241; 423/650
[58] Field of Search .......... 423/210, 230, 231, 242 R, 423/242 A, 244 R, 244 A, 415 A, 648.1, 650; 422/241; 252/373; 48/197 R, 197 FM, 199 FM, 200, 201, 202, 210, 211, 212, 213, 214 R, 215

[56] References Cited

U.S. PATENT DOCUMENTS

| | | | |
|---|---|---|---|
| 1,799,885 | 4/1931 | Chavanne | 48/203 |
| 2,644,745 | 7/1953 | Hemminger | 48/203 |
| 2,709,676 | 5/1955 | Krebs | 208/53 |
| 3,607,156 | 9/1971 | Schlinger et al. | 48/206 |
| 3,607,157 | 9/1971 | Schlinger et al. | 48/202 |
| 3,673,080 | 6/1972 | Schinger et al. | 208/131 |
| 3,920,579 | 11/1975 | Slater | 252/373 |
| 4,052,176 | 10/1977 | Child et al. | 55/32 |
| 4,272,399 | 6/1981 | Davis et al. | 252/373 |
| 4,411,670 | 10/1983 | Marion et al. | 48/197 R |
| 4,598,652 | 7/1986 | Hepworth | 423/230 |
| 4,654,164 | 3/1987 | Najjar | 48/215 |
| 4,668,428 | 5/1987 | Najjar | 252/373 |
| 4,668,429 | 5/1987 | Najjar | 252/373 |
| 4,781,731 | 11/1988 | Schlinger | 252/373 |

FOREIGN PATENT DOCUMENTS 224313 8/1958 Australia ............... 252/373

OTHER PUBLICATIONS

Perry's Chemical Engineers' handbook, Perry et al., eds. 6th ed. McGraw–Hill Book Co., 1984, pp. 23–63.

Primary Examiner—Jeffrey E. Russel
Attorney, Agent, or Firm—Robert A. Kulason; James J. O'Loughlin; Albert Brent

[57] ABSTRACT

Synthesis gas is produced by the partial oxidation of a high silicon and sulfur-containing heavy liquid hydrocarbonaceous fuel and/or petroleum coke having a nickel and vanadium-containing ash that includes calcium and sodium, in a mixture with an iron and/or copper containing additive in a vertical free-flow reaction zone lined with refractory A or a combination of refractory A and refractory B. Refractory A lining of the reaction zone comprises in wt %: $Cr_2O_3$ about 20 to 82, MgO about 5.0 to 45, $Fe_2O_3$ about 0 to 10.5, $Al_2O_3$ about 0 to 6.2, CaO about 0 to 1.0, $SiO_2$ about 0 to 2.5, and others about 0 to 1.3. Refractory B comprises in wt. %: $Cr_2O_3$ about 0 to 40, MgO about 20 to 85, $Fe_2O_3$ about 0 to 16, $Al_2O_3$ about 0 to 9.0, $SiO_2$ about 0 to 2.7, and others about 0 to 1.1. In the reaction zone separate portions of said Fe and/or Cu containing additive: (1) combine with portions of said Fe, Ni, and S to generate a liquid phase washing agent; (ii) combine with a portion of refractory components, and V, Fe, Ni and Al to form high melting spinel and oxide lath phases which are washed by said liquid phase washing agent; and (iii) combine with a portion of said Ni, Ca, Si, Al, Mg and Na to generate a liquid oxide silicate phase that fluxes substantially all of the remaining vanadium and other ash components.

38 Claims, 1 Drawing Sheet

SPINELS IN SILICATE MATRIX
IRON OXIDE WITH UNSUITABLE REFRACTORY
FIELD OF VISION = 0.5 mm

SPINELS IN SILICATE MATRIX
IRON OXIDE WITH SUITABLE REFRACTORY
FIELD OF VISION = 1.1 mm

PARTIAL OXIDATION PROCESS

This is a continuation-in-part of copending applications Ser. No. 07/051,982 filed May 19, 1987 now U.S. Pat. No. 4,826,627; Ser. No 07/62,018 filed June 15, 1987 now U.S. Pat. No. 4,801,438; and Ser. No. 07/100,673 filed Sept. 24, 1987 now U.S. Pat. No. 4,808,386; and Ser. No. 07/032,157 filed Mar. 27, 1987 now U.S. Pat. No. 4,774,021.

FIELD OF THE INVENTION

This invention relates to the simultaneous partial oxidation and desulfurization of high silicon and sulfur-containing heavy liquid hydrocarbonaceous fuels, high silicon and sulfur-containing petroleum coke, or mixtures thereof to produce gaseous mixtures comprising $H_2 + CO$. More particularly it pertains to an additive-refractory combination for removing nickel and vanadium-containing contaminants along with other molten ash components which are produced during the partial oxidation of a high silicon and sulfur-containing heavy liquid hydrocarbonaceous fuel and/or high silicon and sulfur-containing petroleum coke having a nickel and vanadium-containing ash to produce synthesis gas, reducing gas, or fuel gas.

The partial oxidation of liquid hydrocarbonaceous fuels such as petroleum products and slurries of solid carbonaceous fuels such as coal and petroleum coke are well known processes. However, troublesome molten slags are produced along with the product gas in the free-flow unobstructed vertical reaction zone of the partial oxidation gas generator. At the high temperature e.g. about 2700° F. to 3000° F. prevailing in the reaction zone, the highly corrosive molten slag attacks the refractory which lines the reaction zone. Lining failures have sometimes occurred within a few hundred hours. For example, magnesite refractories have little resistance to slag attack while gasifying high silicon sulfur-containing petroleum coke and/or heavy liquid hydrocarbonaceous fuels. A compatible additive-refractory system is provided by the subject invention wherein the molten slag is modified by contact with the refractory so that it runs more freely from the gasifier. The refractory lining resists substantial corrosion, erosion, and chemical attack by the additive modified molten slag. The life of the refractory lining is extended. Costly down-times for replacement of the refractory lining are thereby avoided.

Previous gasification runs with delayed coke and/or ash-containing heavy liquid hydrocarbonaceous fuel gave rise to some unexpected operating problems. The ash, which normally melts and is discharged from the gasifier as a slag, was not melting completely and being discharged but was building up on the walls of the refractory. Vanadium and nickel constituents of the ash in said materials collected on the gasifier walls and formed oxides during shut-down. Upon subsequent exposure of the gasifier walls to air these deposits involving vanadium can catch fire with vanadium converting to the lower melting $V_2O_5$ or metal vanadate states. The strong solvent action of vanadium oxide on the refractory lining contributed to the clogging of the outlet in the bottom of the gasifier. Nickel impurities may under certain conditions form troublsome nickel oxide and nickel sulfide downstream in the system. Fluxing as used in coal operations and in U.S. Pat. Nos. 1,799,885 and 2,644,745 does not provide a solution to applicants' problem involving troublesome vanadium and nickel. The subject invention is an improvement in the art since it permits long time operation of the partial oxidation gas generator without shut-down due to failure of the refractory lining in the reaction zone that was brought about by the presence of vanadium.

The foreseeable trend for petroleum reserves is that the produced crude will be increasingly heavier and of poorer quality. To compensate for this trend, refiners must employ more "bottom of the barrel" upgrading to provide the desired light products. The current industry workhouse to provide this upgrading is some type of coking operation (either delayed or fluid). A good deal of current refinery expansion includes the installation or expansion of coker units; and thus, coking will be a process of general use for some time to come. Since the crudes contain more contaminants, i.e. sulfur, metals (predominately vanadium, nickel, and iron) and ash, and these contaminants are concentrated in the product coke, this coke is of a much poorer quality and is excluded from its normal product applications. Because the crudes are heavier, i.e., contain more coke precursors, more of this poorer quality coke is produced from each barrel of ash-containing heavy liquid hydrocarbonaceous fuel. The manufacture of petroleum coke pellets by a delayed coking process is described in coassigned U.S. Pat. No. 3,673,080. A fluid coking process is described in U.S. Pat. No. 2,709,676.

By conventional partial oxidation gasification processes, sulfur containing gases e.g. $H_2S$ and COS in the amount of about 0.1 to 2.0 mole % are produced along with the $H_2 + CO$. These sulfur-containing gaseous impurities are undesirable. They corrode piping and equipment upon contact; and, they deactiviate catalysts. Ordinarily raw gas streams from the reaction zone may require additional downstream gas purification in order to remove the sulfur-containing gases. The need for means to remove a major portion of the sulfur in synthesis gas as generated by the partial oxidation process is widely recognized. In particular, removal of sulfur from synthesis gas at high temperature is of great interest. The combined-cycle thermal efficiency is improved by eliminating the need to cool the product gases prior to low-temperature acid-gas wet scrubbing. Gaseous impurities, including $H_2S$, COS and $CO_2$ are removed from raw synthesis gas by low temperature condensation and by solvent absorption in a separate gas purification operation located downstream from the gas generator in coassigned U.S Pat. No. 4,052,176. Further, in said process, it is necessary to cool the hot raw gas stream from a temperature of 2700° F. to −70° F. before the sulfur-containing gas are separated. Advantageously, the subject invention described herein employs a vertical free-flow unobstructed refractory lined generator operating in the slagging mode and in an extremely reducing atmosphere. The hot effluent gas stream is desulfurized with substantially no reduction in temperature. Further, the life of the refractory lining in the gas generator is increased. Also, iron is tied up in the molten ash as iron silicates and sulfides; and substantially no elemental iron, e.g. not more than 5.0 wt. % of the slag is produced.

SUMMARY OF THE INVENTION

This is a process for the production of gaseous mixtures comprising $H_2 + CO$ by the partial oxidation of a feedstock comprising a high silicon and sulfur-containing heavy liquid hydrocarbonaceous fuel having a nickel and vanadium-containing ash, or a high silicon and sulfur-containing petroleum coke having a nickel and vanadium-containing ash, or mixtures thereof; and said feedstock includes a minimum of 0.5 wt. % sulfur and more than about 350 parts per million (ppm) of silicon; such as in the range of about 350 parts per million (ppm) to about 50,000 ppm of silicon; and said ash includes a minimum of 5.0 wt. % of vanadium, such as about 5.0 to 20 wt. %; a minimum of 2.0 wt. % of nickel, such as about 2.0 to 20 wt. %; and a minor amount of calcium and sodium e.g. less than about 5 wt. % of the ash. The process includes the steps of:

(1) mixing together an iron and/or copper-containing additive with said feedstock; wherein the weight ratio of iron and/or copper-containing additive to ash in the reaction zone in (2) is in the range of about 1.0–10.0 to 1.0, and there is at least 10 parts by weight of iron and/or copper for each part by weight of vanadium;

(2) reacting said mixture from (1) at a temperature in the range of about 2200° F. to 3000° F. and at a pressure in the range of about 2 to 250 atmosphere in a free-flow vertical refractory lined partial oxidation zone with a free-oxygen containing gas in the presence of a temperature moderator and in a reducing atmosphere to produce a hot raw effluent gas stream comprising $H_2+CO$ and entrained molten slag; wherein said refractory lining comprises refractory A or refractory A and refractory B, and refractory A comprises in weight percent: $Cr_2O_3$ about 20 to 82, MgO about 5 to 45, $Fe_2O_3$ about 0 to 10.5, $Al_2O_3$ about 0 to 6.2, CaO about 0 to 1.0, $SiO_2$ about 0 to 2.5, and others about 0 to 1.3, such as titania; and refractory B comprises in weight percent: $Cr_2O_3$ about 0 to 40, MgO about 20 to 85, $Fe_2O_3$ about 0 to 16, $Al_2O_3$ about 0 to 9.0, $SiO_2$ about 0 to 2.7, CaO about 0 to 0.5; and others about 0 to 1.1, such as titania; and where in said reaction zone separate portions of the said iron and/or copper-containing additive (i) combine with portions of said iron, nickel, and sulfur to generate a liquid phase washing agent, (ii) combine with a portion of the refractory components, vanadium, iron, nickel and aluminum to form high melting spinel and oxide lath phases which are washed by said first liquid phase washing agent; and (iii) combines with a portion of said nickel, calcium, silicon, aluminum, magnesium and sodium to generate a liquid oxide-silicate phase that fluxes substantially all of the remaining vanadium and other ash components; and (3) separating nongaseous materials from said hot raw effluent gas stream.

In one embodiment, a mixture of high silicon sulfur-containing heavy liquid hydrocarbonaceous fuel containing more than 350 ppm of silicon and having a nickel and vanadium-containing ash and iron and/or copper-containing additive is fed to coker unit to produce petroleum coke with a nickel and vanadium-containing ash, and with said additive being uniformly dispersed throughout. This petroleum coke is then reacted in the partial oxidation gas generator to produce synthesis gas, reducing gas or fuel gas.

In another embodiment, a minor amount of an additional material e.g. about 1 to 5 wt. % of ash, selected from the group of oxides of the elements consisting of magnesium, chromium, calcium, sodium, manganese, and mixtures thereof is introduced into the reaction zone. These additional elements further increase life of the refractory by forming a spinel before the vanadium interacts with the refractory. Further, the fluidity of the slag is increased. These additional materials are provided in the total amount of about 1.0 to 10.0 wt. % of the iron and/or copper-containing additive. There is no formation of elemental iron and/or copper.

DISCLOSURE OF THE INVENTION

Figure 1:
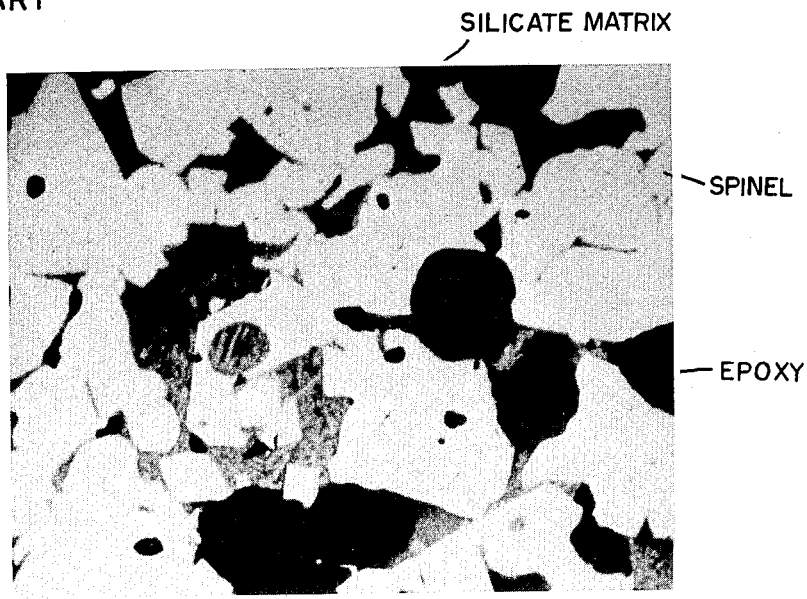
FIG. 1 illustrates slag from a partial oxidation gasifier lined with an unsuitable magnesium refractory.

The partial oxidation of heavy liquid hydrocarbonaceous fuel and petroleum coke are described respectively in coassigned U.S. Pat. Nos. 4,411,670 and 3,607,156, which are incorporated herein by reference. Further, suitable free-flow refractory lined gas generators and burners that may be used in the production of synthesis gas, reducing gas, or fuel gas from these materials are also described in the aforesaid references. Advantageously, the subject process uses relatively inexpensive feedstocks comprising high silicon and sulfur-containing heavy liquid hydrocarbonaceous fuel and/or petroleum coke feedstocks having nickel and vanadium-containing ashes. Further, said feedstock includes a minimum of 0.5 wt. % of sulfur, such as at least 2.0 wt. % sulfur; and more than about 350 ppm, such as about 380 ppm to about 50,000 ppm of silicon; and said ash includes a minimum of 5.0 wt. % of vanadium, such as about 5.0 to 20.0 wt. %; a minimum of 2.0 wt. % of nickel, such as about 2.0 to 20.0 wt. %, and a minor amount of calcium and sodium e.g. less than 5 wt. % of the ash.

By definition, the term high silicon and sulfur-containing heavy liquid hydrocarbonaceous material or fuel having a nickel and vanadium-containing ash is a petroleum or coal derived fuel having the composition specified above and selected from the group consisting of virgin crude, residua from petroleum distillation and cracking, petroleum distillate, reduced crude, whole crude, asphalt, coal tar, coal derived oil, shale oil, tar sand oil, and mixtures thereof.

By definition, the term high silicon and sulfur-containing petroleum coke having a nickel and vanadium-containing ash is a petroleum coke made from ash containing high silicon and sulfur-containing heavy liquid hydrocarbonaceous fuel by conventional coking methods such as by the delayed or fluid coking process, such as described in coassigned U.S. Pat. No. 3,673,080 which is incorporated herein by reference.

Close study of the ashes derived from the partial oxidation, without an additive, of a feedstock comprising high silicon and sulfur-containing heavy liquid hydrocarbonaceous fuels and/or petroleum coke having nickel and vanadium-containing ashes in a gas generator lined with refractory A or B shows that they are largely composed of oxide and sulfide compounds of vanadium, nickel, iron, along with some normally occurring mineral matter species. Vanadium-containing oxide laths are present and may be selected from the group consisting of V, V+Ca, V+Fe, V+Al, and mixtures thereof. Vanadium-containing spinels are present and may include any metal selected from the group consisting of V, Fe, Cr, Al, Mg and mixtures thereof. The presence of abundant interlocking needle to lath-like crystals is the cause of the high viscosity of the slag. Advantageously, such interlocking is substantially absent in the slag from the subject process.

The metals present in the ash derived in the subject process provide a system that is significantly different from that occurring in coal. A further factor is that the total ash content of the petroleum coke or heavy liquid hydrocarbonaceous fuel may be only about one-half to 5 weight percent (wt. %), whereas coal typically contains 10-20 wt. % ash. The comparatively low ash concentration in petroleum coke and heavy liquid carbonaceous fuel may be the reason why the ash removal problem is only noticed after prolonged gasifier runs. The chance for effective ash and additive mixing that is necessary to wash the vanadium constituents out of the reaction zone or for effective fluxing is therefore greatly reduced.

It is theorized that in the heavy liquid hydrocarbonaceous material and petroleum coke systems, a good deal of the ash material is liberated as individual molecular species. This is because upon vacuum distillation or coking, the metallic species in the crude, which are generally present as porphyrin type structures (metal atoms, oxides or ion thereof confined in an organic framework), are entrapped within the collapsed carbon matrix.

Problems arise when the heavy metal constituents buildup in the system. In particular, vanadium and nickel are known to accumulate on the walls of the refractory lined reaction zone of the partial oxidation gas generator and not flow smoothly from the gasifier under normal gasifier conditions. During shut down and subsequent exposure of the gasifier walls to air, these deposits involving vanadium can catch fire with the vanadium converting to the lower melting $V_2O_5$ or metal vanadate states. These materials prove to be very corrosive to refractory thereby decreasing the life of the refractory lining of the reaction zone. These problems and others are minimized by the subject process in which the amount of vanadium constituents remaining in the reaction zone are substantially reduced or eliminated. Further, the subject unique refractory lining the reaction zone of the gasifier withstands attack by the corrosive molten slag.

This invention pertains to the partial oxidation of a high silicon and sulfur-containing heavy liquid hydrocarbonaceous fuel and/or petroleum coke, and provides an improved combination of iron and/or copper-containing additive and refractory lining in the partial oxidation reaction zone. Further, a means of introducing this addition agent into the system to give maximum effectiveness is provided. Two types of refractory linings may be used e.g. refractory A or a combination of refractory A and B. The refractory A lining of the partial oxidation reaction zone has the following composition in the wt. %: $Cr_2O_3$ about 20 to 82, MgO about 5.0 to 45, $Fe_2O_3$ about 0 to 10.5, $Al_2O_3$ about 0 to 6.2, CaO about 0 to 1.0, $SiO_2$ about 0 to 2.5, and others about 0 to 1.3, such as titania. The refractory B lining of the partial oxidation reaction zone comprises in weight percent: $Cr_2O_3$ about 0 to 40, MgO about 20 to 85, $Fe_2O_3$ about 0 to 16, $Al_2O_3$ about 0 to 9.0, $SiO_2$ about 0 to 2.7, and others about 0 to 1.1, such as titania. Refractory A is the preferred refractory from a wear point for lining the entire reaction zone, but it is more expensive than refractory B. Refractory B may be used for lining the lower third of the reaction zone where the temperature is generally lower e.g. about 100° F. lower than the upper portion of the gasifier. In such case, refractory B would be used to line the lower third of the reaction zone and refractory A would be used to line the remainder of the reaction zone. A fused cast refractory is preferred. While fused casts are more expensive and less resistant to thermal cracking, they offer reduced tendency for slag penetration.

The iron and/or copper-containing additive comprises an iron and/or copper compound, preferably iron oxide and/or copper oxide. The iron and/or copper-containing additive may comprise about 30.0 to 100.0 wt. % of an iron and/or copper compound. In the reaction zone of the partial oxidation gas generator, a first portion e.g. about 5.0 to 95 wt. % of the additive combines with a portion, such as substantially all or a large fraction e.g. about 90 to 97 wt. of the nickel and about 30 to 90 wt. %, say about 50 to 70 wt. % of the iron, and sulfur constituents found in the feedstock to produce a first low viscosity liquid phase washing agent or carrier. Minor amounts of other elements from the feedstock may be picked up by the first liquid phase washing agent and dissolved therein in the amount of about 1.5 to 7.0 wt. % of the first liquid phase washing agent. Accordingly, a minor amount of at least one extraneous element selected from the group consisting of Al, Ca, V, Si, Ti, Mg, Mn, Na, K, and mixtures thereof may be optionally present in the first liquid phase washing agent. A second portion e.g. in the range of about 0.1 to 25 wt. % of the iron and/or copper-containing additive combines with a portion, such as substantially all or a large fraction e.g. about 40 to 100 wt. %, say about 70 to 90 wt. % of the refractory components, and vanadium, nickel and aluminum to form a high melting spinel and oxide lath phases. The refractory components comprise about 5.0 to 85 wt. % of the spinel and oxide lath phases; and the V, Fe, Ca, Ni, and Al comprises the remainder. The high melting spinel and oxide lath phases are washed by the first liquid phase washing agent. A third portion of the iron and/or copper-containing additive e.g. in the range of about 3.0 to 80 wt. % combines with nickel, calcium, silicon, aluminum, magnesium and sodium to generate a liquid oxide-silicate phase that fluxes substantially all of the remaining vanadium and other ash components.

Advantageously, by the subject process the sulfur content in the gas, and the downstream gas cleaning costs are substantially reduced or possibly eliminated. Further, in one embodiment substantially all of the sulfur in the feedstock is converted into the sulfide of iron and/or copper, and nickel and leaves the reaction zone in the slag.

An elemental analysis of the first liquid phase washing agent substantially comprises in wt. % vanadium about 0 to 6.0, iron about 5.0 to 90, copper about 0 to 85, nickel about 0.01 to 5.0, and sulfur about 5.0 to 32. The amount of the first liquid phase washing agent is about 5.0 to 98 wt. % of the slag. A minor amount of at least one of the following extraneous elements may be optionally present in the first liquid phase washing agent in the reaction zone in wt. %: vanadium about 0.01 to 5.0, silicon about 0.1 to 5.0, magnesium about 0.1 to 6.0; and aluminum about 0.01 to 1.0. It was unexpectedly found that most of the nickel e.g. 95 wt. % or more goes into the first liquid phase washing agent. Accordingly, in one embodiment to insure the elimination of harmful nickel subsulfide, the amount of the first liquid phase washing agent comprises at least about 5.0 wt. % (basis total weight amount of slag). An elemental analysis of the high melting spinel and oxide lath phases comprises in wt. % refractory components about 5.0 to 80, vanadium about 3.0 to 70, iron about 2.0 to 65, nickel about 0 to 5.0, aluminum about 0.1 to 45, and calcium about 0 to 15. The amount of high melting spinel and oxide lath phases is about 0.1 to 20 wt. % of the slag. An elemental analysis of the liquid oxide silicate phase substantially comprises in wt. %: iron about 4.0 to 55, calcium about 1.0 to 45; magnesium about 0.01 to 3.0; aluminum about 0.1 to 35, silicon about 10 to 55, and sodium and/or potassium about 0.1 to 6.2, copper about 0.0 to 2.1, vanadium about 0.1 to 13, and sulfur about 0.01 to 1.9. The amount of liquid oxide silicate phase is about 2.0 to 96 wt. % of the slag.

It is unexpectedly found that the first liquid phase washing agent has a strong wetting capability for the refractory lining and the high temperature non-flowing vanadium-containing oxide laths and spinels in the reaction zone. This washing agent functions in a completely different manner than that of a typical fluxing additive which may be used, for example to solubilize slag constituents in coal. For example, this washing agent does not solubilize the troublesome vanadium-containing oxide laths and spinels. Rather, it serves as a carrier and washes them out of the reaction zone. This washing agent washes at least a portion, such as from about 60 to 100 wt. %, say about 70 to 90 wt. %, and preferably all of the vanadium-containing contaminants out of the reaction zone of the partial oxidation gas generator. The mixtures of the first liquid phase washing agent, the high melting spinel and oxide lath phases, and the liquid oxide silicate phase are referred to herein as slag. Combined with the molten slag in the amount of about 1.0 wt. % is a small portion of the refractory lining in the reaction zone. The vanadium-containing oxide laths and spinels contain (i) substantially all e.g. 80 to 99 wt. % or a large fraction e.g. 85 to 95 wt. % of the vanadium present in the feed; (ii) the remainder of the Fe and/or Cr, Al, Mg, Ti and other minor impurities from the iron and/or copper-containing additive and/or feedstock; and (iii) refractory components. The vanadium-containing oxide laths and spinel comprise about 1 to 10 wt. %, such as about 1 to 8 wt. % of vanadium oxide. In general, the vanadium-bearing compounds tend to concentrate in the high melting spinel and oxide laths phases rather than in the first liquid phase washing agent. In some cases when the amount of this material is less than 1.0 wt. %, the vanadium-bearing spinels are so abundant that they actually constitute a more or less continuous mass. It is apparent that the vanadium-bearing spinels form very early in the crystallization sequence. Further, they have very high melting points and the grains composed of major proportions of them are rigid to very viscous at very high temperatures. The first liquid phase washing agent, in contrast with the high melting spinel and oxide lath phases, has a much lower melting point, and a much lower viscosity. However, it also contains very much less of the vanadium-containing spinels. For example, the melting point and viscosity of the first liquid phase washing agent are in the range of about 1900° to 2200° F., and about 5 to 120 poises respectively; whereas, the melting point and viscosity of the high spinel and oxide lath phases is greater than 2750° F. and the viscosity is too high to be measured.

The distribution of iron between the first liquid phase washing agent and the high melting spinel and oxide lath phases is influenced by the partial pressures of the oxygen and/or $S_2$ gas in the reaction zone. The lower the partial pressure of oxygen and/or $S_2$ gas at a given temperature, the more iron and/or copper is driven into the first liquid phase washing agent in preference to the second liquid phase washing agent. The formation of elemental iron and/or copper in the reaction zone leads to difficulties with slag removal. In order to prevent elemental iron and/or copper from forming, the partial pressure in atmospheres of the oxygen and/or $S_2$ gas in the reaction zone of the gasifier at a specific temerature is kept slightly above that calculated by Formula I and/or II below.

The relationship between temperature in the reaction zone (T° Fahrenheit), and the common logarithm of the equilibrium partial pressure of oxygen log $P_{(O2)}$ in atmospheres in the reaction zone is shown by Formula I. When the equilibrium partial pressure of oxygen in the reaction zone drops below that calculated in Formula I for the design temperature in the reaction zone, then sufficient supplemental free-oxygen containing gas is introduced into the reaction zone to restore the equilibrium partial pressure of the oxygen in the reaction zone to a value which is slightly above that calculated in Formula I. Additions of supplemental free-oxygen containing gas in excess of that required to do the job are economically unattractive. Further, they will reduce the efficiency of the process and should be avoided.

$$\log P_{(O2)} = -38.9691 + 0.01744T°F - 0.0000024T^{2°}F. \qquad \text{I}$$

wherein: T is the temperature in the reaction zone in the range of about 2100° F. to 3000° F.

For example, when the temperature in the reaction zone is 2200° F., a first value for the equilibrium partial pressure of oxygen in the reaction zone, as determined from Formula I, is $6.07 \times 10^{-13}$ atmospheres. This value for the partial pressure of the oxygen in the reaction zone is compared with a second value of the partial pressure of oxygen which is determined by conventional calculations of the reactions going on in the reaction zone of the gasifier. When the second value for the partial pressure of oxygen is less than the value calculated from Formula I then sufficient supplemental free-oxygen containing gas e.g. air, oxygen, oxygen-enriched air is introduced into the reaction zone to bring the partial pressure of oxygen to a value which is slightly above $6.07 \times 10^{-13}$ atmospheres, such as to about $6.25 \times 10^{-13}$ atmospheres or above. The term "slightly above" means an increase of about 3%.

As previously mentioned, elemental iron and/or copper may be prevented from forming in the reaction zone of the partial oxidation gas generator by maintaining the partial pressure of $S_2$ gas in the reaction zone above the value calculated from Formula II below for the specified reaction zone temperature. The relationship between the temperature in the reaction zone (T° Farhrenheit), and the common logarithm of the equilibrium partial pressure of $S_2$ gas "log $P_{(S2)}$" in atmospheres is shown in Formula II. When the equilibrium partial pressure of the $S_2$ gas in the reaction zone drops below that calculated in Formula II for the design temperature in the reaction zone, then sufficient supplemental elemental sulfur or a sulfur-containing material is introduced into the reaction zone to bring the equilibrium partial pressure of the $S_2$ gas in the reaction zone to a value which is slightly above that calculated in Formula II. Additions of supplemental elemental sulfur or sulfur-containing materials in excess of that required to do the job are economically unattractive and should be avoided. Further, costly downstream purification steps for the $S_2$ gas may be then avoided.

$$\log P_{(S_2)} = -17.3454 + 0.007857T°F - 0.00000011T^{2}°F. \quad \text{II}$$

wherein: T is the temperature in the reaction zone in the range of about 2100° F. to 3000° F.

For example, when the temperature in the reaction zone is 2200° F., the equilibrium partial pressure of $S_2$ gas in the reaction zone when calculated from Formula II is $4.1 \times 10^{-6}$ atmospheres. This value for the partial pressure of $S_2$ gas in the reaction zone is compared with a second value for the partial pressure of $S_2$ gas which is determined by conventional calculations for the reactions going on in the reaction zone of the gasifier. When the second value for the partial pressure of $S_2$ gas is less than the value calculated from Formula II, then sufficient supplemental elemental sulfur or sulfur-containing material e.g. metal sulfides, $H_2S$, COS, $SO_2$ are introduced into the reaction zone to restore the equilibrium partial pressure of $S_2$ gas to a value which is slightly above $4.1 \times 10^{-6}$ atmospheres, such as about 4.22 $10^{-6}$ atmospheres. The term "slightly above" means an increase of about 3%.

In another embodiment, it was unexpectedly found that other benefits could be achieved by including in the iron and/or copper-containing additive, an additional material selected from the group of elements consisting of magnesium, chromium, calcium, sodium, manganese, and mixtures thereof. The elements are provided as suitable compounds selected from the groups consisting of oxides, hydroxides, carbonates, bicarbonates, sulfates, nitrates and mixtures thereof. The total amount of said additional materials may be in the range of about 1.0 to 10.0 wt. %, such as about 2.0 to 8.0 wt. % of the iron and/or copper-containing additive. The addition of the aforesaid supplemental amount of materials saturates the slag with respect to these constituents thereby preventing their dissolution from the refractory. The life of the refractory lining is thereby extended.

A suitable amount of iron and/or copper-containing additive is introduced into the reaction zone along with the fuel feedstock in order to satisfy the following two ratios: (i) a wt. ratio of iron and/or copper-containing additive to ash (noncombustible material) in the reaction zone in the range of about 1.0–10.0 to 1.0, such as in the range of about 1–6 to 1; and (ii) at least 10 parts by weight, such as about 10–30, say 20 parts by weight of iron and/or copper for each part by weight of vanadium.

Advantageously by the subject process, the first washing phase which is produced in the reaction zone has a low viscosity in comparison with prior art high viscosity slag. This facilitates slag removal. Further, at shut-down of the gasifier, the inside surfaces of the top dome and refractory walls of the reaction zone may be rendered clean and with substantially no accumulation of vanadium contaminants.

The partial oxidation reaction takes place in a reducing atmosphere under the following condition: temperature about 2200° F. to 3000° F., such as about 2300° F. to 2600° F.; say about 2725° F. to 2825° F. Further, the temperature in the reaction zone is 100° F. to 200° F. above the fluid temperature of the slag; pressure is about 2 to 250 atmospheres; $H_2O$/fuel weight ratio is in the range of about 0.1 to 5.0, such as about 0.2 to 0.9; and atomic ratio of free oxygen to carbon in the fuel (O/C ratio) is in the range of about 0.6 to 1.6, such as about 0.8 to 1.4.

The composition of the hot, raw effluent gas stream directly leaving the reaction zone of the free-flow partial oxidation gas generator is about as follows, in mole percent: $H_2$ 10 to 70, CO 15 to 57, $CO_2$ 0.1 to 30, $H_2O$ 0.1 to 20, $CH_4$ nil to 60, $H_2S$ nil to 0.5, COS nil to 0.05, $N_2$ nil to 60, and $A_r$ nil to 2.0. Particulate carbon is present in the range of about 0.2 to 20 weight % (basis carbon content in the feed). Ash is present in the range of about 0.5 to 5.0 wt. %, such as about 1.0 to 3.0 wt. % (basis total weight of fuel feed). Depending on the composition after removal of the entrained particulate carbon and ash by quench cooling and/or scrubbing with water and with or without dewatering, the gas stream may be employed as synthesis gas, reducing gas or fuel gas.

Another aspect of this invention is that the iron and/or copper-containing additive may be selected on the basis of serendipitous catalytic properties during coking in addition to its use in the generation of the washing agent during gasification, as previously described. For example, it may act to produce more and/or a better quality of light products from the coker operation. It may also aid in the gasification reactions either by increasing the reaction rate and thus the throughput capacity of the gasifier or by increasing the conversion of the soot and thus the overall efficiency of the process. Again, however, this invention does not depend on the catalytic properties of the iron and/or copper-containing additive.

It was unexpectedly found that a preferred iron-containing additive for mixing with the high silicon and sulfur-containing heavy liquid hydrocarbonaceous material having a nickel and vanadium-containing ash or high silicon and sulfur-containing petroleum coke having a nickel and vanadium-containing ash is selected from the group consisting of elemental iron; iron compounds including oxides, sulfides, carbonates, cyanides, nitrates; and mixtures thereof. In another embodiment, the iron compound is a water soluble iron salt. In still another embodiment, the iron compound is a ferro or ferri organic compound selected from the group consisting of naphthenates, oxalates, acetates, citrates, benzoates, oleates, tartrates, and mixtures thereof. The copper-containing additive is a copper compound selected from the group consisting of oxide, sulfide, sulfate, hydroxide, carbonate, cyanide, chloride, nitrate and mixtures thereof. In another embodiment, the copper-containing additive is a copper compound selected from the group consisting of naphthenate, oxalate, acetate, benzoate, oleate, tartrate, and mixtures thereof.

In one embodiment of the subject invention the aforesaid mixture of fuel feedstock and the iron and/or copper-containing additive are introduced into the partial oxidation gasifier. In another embodiment, the iron and/or copper-containing additive is mixed with the high silicon and sulfur-containing heavy liquid hydrocarbonaceous material having a nickel and vanadium-containing ash and the mixture is then fed into a conventional coking unit to produce petroleum coke. By this means, the finely ground iron and/or copper-containing additive may be intimately mixed throughout the petroleum coke product. The preferable particle size of the comminuted iron and/or copper-containing additive and the comminuted petroleum coke is in the range of ASTM E-11 Standard Sieve Designation about 212 microns to 38 microns, or below. The ingredients of the aforesaid mixtures may be separately ground and then mixed together. Alternatively, the ingredients may be wet or dry ground together. Intimate mixing of the solid materials is thereby achieved, and the particle sizes of each of the solid materials in the mixture may be substantially the same. The dry ground mixture may be mixed with water or a liquid hydrocarbonaceous materials or both to produce a pumpable slurry having a solids content in the range of about 50–65 wt. %. The slurry is then gasified by partial oxidation in the manner previously described. Alternatively, the solid materials may be wet ground with the liquid slurry medium. In another embodiment, the mixture of particulate solids may be entrained in a gaseous medium and then introduced into the partial oxidation gas generator. The gaseous transport medium may be selected from the group consisting of steam, $CO_2$, $N_2$ free-oxygen containing gas, recycle synthesis gas, and mixtures thereof.

For example, a mixture comprising high silicon and sulfur-containing high boiling liquid petroleum fuel having a nickel and vanadium-containing ash and the comminuted iron and/or copper-containing additive at a temperature in the range of about 650° F. to 930° F. is introduced into a delayed coking zone, for example, by way of line 33, such as shown and described in coassigned U.S. Pat. No. 3,673,080, which is incorporated herein by reference. At a temperature in the range of about 800° F. to 895° F. and a pressure in the range of about 20 to 60 psig, uncondensed hydrocarbon effluent vapor and steam are removed overhead and petroleum coke in admixture with uniformly dispersed iron and/or copper-containing additive is removed from the bottom of said delayed coking zone.

In one embodiment, a mixture comprising a high silicon and sulfur-containing high boiling liquid petroleum fuel having a nickel and vanadium-containing ash, and the comminuted iron and/or copper-containing additive at a temperature in the range of about 550° F. to 750° F. is introduced into a fluidized bed coking zone for example by way of line 31, such as shown and described in U.S. Pat. No. 2,709,676, which is incorporated herein by reference. At a temperature in the range of about 10 to 20 psig, uncondensed hydrocarbon effluent vapor and steam are removed overhead and said petroleum coke in admixture with uniformly dispersed iron and/or copper-containing additive is removed from the bottom of said coking zone.

In other embodiments, this invention may be applied to other similar petroleum processes that produce a stream suitable for gasification. Any "bottom of the barrel" process that does not upgrade the bottoms or residue stream to extinction must ultimately produce such a stream. These streams, either liquid or normally solid but pumpable at elevated temperatures, will produce the same gasification problems discussed for coke. Thus, the invention of introducing an iron and/or copper-containing additive as part of the petroleum processing prior to gasification should, depending on the specific process, produce a feedstock that will be free of the gasification problems mentioned above. Most of these processes employ vacuum distillation as a pretreatment. Accordingly, as described above, the iron and/or copper-containing addition agent may be mixed with the vacuum distillation feed having a nickel and vanadium-containing ash. The additive will then emerge from the distillation column in the bottoms stream. In turn, the bottoms stream is the feed stream for the upgrading process. This incorporation of the iron and/or copper-containing additive should not adversely affect these processes, and the iron and/or copper-containing addition agent should ultimately emerge with the vanadium-rich residue stream from each respective process. In all of these processes, this residue stream should be suitable for gasification by partial oxidation.

EXAMPLES

The following examples are offered for a better understanding of the present invention, but the invention is not to be construed as limited thereto.

Synthesis gas is produced in a vertical free-flow unobstructed refractory lined partial oxidation reaction zone, such as that shown and described in coassigned U.S. Pat. No. 3,607,157, which is incorporated herein by reference. The feedstock comprises an atomized aqueous dispersion of petroleum coke having a nickel and vanadium-containing ash. The petroleum feedstock contains about 3.2 wt % of sulfur and more than 350 ppm of silicon. The ash in the petroleum coke comprises about 12.0 wt. % of vanadium, and about 5.0 wt. % of nickel. The petroleum coke also has uniformly dispersed therein an iron and/or copper-containing additive comprising about 100 wt. % of iron and/or copper oxide. The wt. ratio of iron and/or copper-containing additive to ash is about 5 to 1. The weight ratio of iron and/or copper to vanadium in the reaction zone is about 16 to 1. The solids content of the slurry is about 60 wt. %.

The petroleum coke is reacted with a free-oxygen containing gas e.g. air, oxygen-enriched air, substantially pure oxygen, in the presence of a temperature moderator e.g. $H_2O$, $CO_2$, $N_2$ in the refractory lined partial oxidation reaction zone at an autogenous temperature of about 2450° F. and a pressure of about 60 atmospheres. The molten slag droplets are readily separated from the hot effluent gas stream leaving the reaction zone by gravity or by quenching and/or scrubbing the gas stream with water or other gas scrubbing medium.

Figure 2:
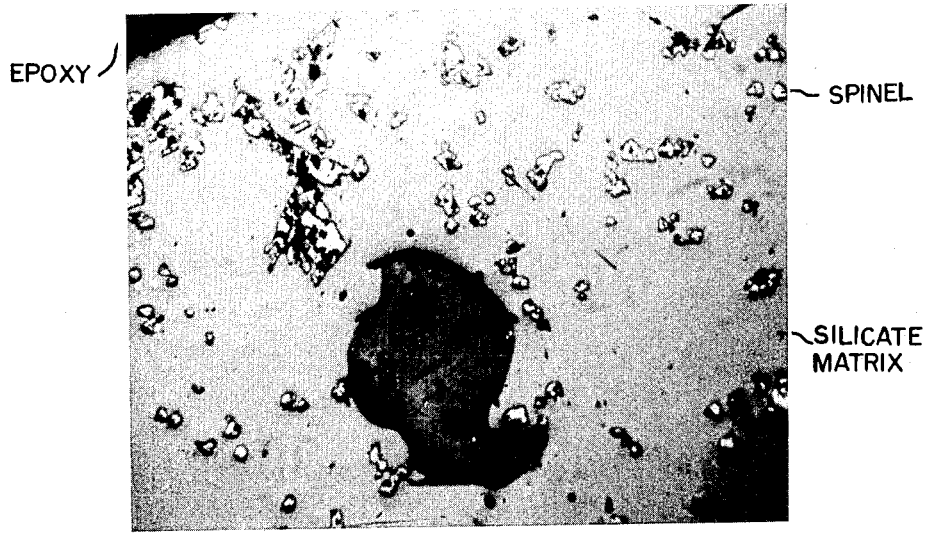
FIG. 2 illustrates slag from a gasifier lined with effective refractory A.

The following is offered to better understand the present invention. The drawing for FIG. 1 illustrates the problem with removing slag produced by the gasification of high silicon and sulfur-containing petroleum coke as previously described with an iron oxide additive in a gasifier line with an ineffective magnesia refractory. FIG. 1 is a photomicrograph that illustrates the potential refractory slag problems that might result from the use of the iron oxide additive with an unsuitable magnesite refractory liner. The abundance of spinels is indicative of the high wear rate of the ineffective magnesite refractory. FIG. 2 is a photomicrograph that illustrates applicants' invention and shows the success of the iron oxide additive when used with a compatible hot face refractory A liner of the type previously described. FIG. 2 is a photomicrograph that shows the reaction product of the coke silicate/vanadium phase with iron oxide additive and refractory A. The localized nature and lesser amounts of the spinel shows the effectiveness of refractory A with coke feedstock contaminated with silicon.

Various modifications of the invention as herein before set forth may be made without departing from the spirit and scope thereof, and therefore, only such limitations should be made as are indicated in the appended claims.

We claim:

1. A process for the production of gaseous mixtures comprising $H_2+CO$ by the partial oxidation of a feedstock comprising a high silicon and sulfur-containing heavy liquid hydrocarbonaceous fuel having a nickel and vanadium-containing ash, or a high-silicon and sulfur-containing petroleum coke having a nickel and vanadium-containing ash, or mixtures thereof; and said feedstock includes a minimum of 0.5 wt. % of sulfur, and more than about 350 parts per million of silicon; and said ash includes a minimum of 5.0 wt. % vanadium, a minimum of 2.0 wt. % of nickel, and a minor amount of less than about 5.0 wt. % of the ash of Ca and Na; said process comprising:

(1) mixing together an iron and/or copper-containing additive with said feedstock; wherein the weight ratio of iron and/or copper-containing additive to ash in the reaction zone in (2) is in the range of about 1.0–10.0 to 1.0, and there is at least 10 parts by weight of iron and/or copper for each part by weight of vanadium;

(2) reacting said mixture from (1) at a temperature in the range of about 2200° F. to 3000° F. and at a pressure in the range of about 2 to 250 atmosphere in a free-flow vertical refractory lined partial oxidation zone with a free-oxygen containing gas in the presence of a temperature moderator and in a reducing atmosphere to produce a hot raw effluent gas stream comprising $H_2$ +CO and entrained molten slag; wherein said refractory lining comprises refractory A or a combination of refractory A and refractory B, and refractory A comprises in wt. %: $Cr_2O_3$ about 20 to 82, MgO about 5.0 to 45, $Fe_2O_3$ about 0 to 10.5, $Al_2O_3$ about 0 to 6.2, CaO about 0 to 1.0, $SiO_2$ about 0 to 2.5, and others about 0 to 1.3; and refractory B comprises in weight percent: $Cr_2O_3$ about 0 to 40, MgO about 20 to 85, $Fe_2O_3$ about 0 to 16, $Al_2O_3$ about 0 to 9.0, $SiO_2$ about 0 to 2.7, and others about 0 to 1.1; and where in said reaction zone separate portions of the said iron and/or copper-containing additive (i) combine with portions of said iron, nickel, and sulfur to generate a liquid phase washing agent; (ii) combine with a portion of the refractory components, vanadium, iron, nickel, and aluminum to form spinel and oxide lath phases which are washed by said liquid phase washing agent; and (iii) combine with a portion of said nickel, calcium, silicon, aluminum, magnesium and sodium to generate a liquid oxide-silicate phase that fluxes substantially all of the remaining vanadium and other ash components; and (3) separating nongaseous materials from said hot raw effluent gas stream.

2. The process of claim 1 wherein said additive is an iron-containing additive which is elemental iron or iron compounds selected from the group consisting of oxide, sulfide, sulfate, carbonate, cyanide, nitrate; and mixtures thereof.

3. The process of claim 1 wherein said additive is an iron-containing additive which is a ferro or ferri organic compound selected from the group consisting of naphthenates, oxalates, acetates, citrates, benzoates, oleates, tartrates, and mixtures thereof.

4. The process of claim 1 wherein said additive is an iron-containing additive which is a water soluble iron salt.

5. The process of claim 1 wherein said additive is a copper-containing additive which is a copper compound selected from the group consisting of oxide, sulfide, sulfate, hydroxide, carbonate, cyanide, chloride, nitrate, and mixtures thereof.

6. The process of claim 1 wherein said additive is a copper-containing additive which is a copper compound selected from the group consisting of naphthenate, oxalate, acetate, benzoate, oleate, tartrate, and mixtures thereof.

7. The process of claim 1 wherein said high silicon and sulfur-containing heavy liquid hydrocarbonaceous fuel having a nickel and vanadium-containing ash feedstock is selected from the group consisting of virgin crude, residua from petroleum distillation and cracking process operations, petroleum distillate, reduced crude, whole crude, asphalt, coal tar, coal derived oil, shale oil, and mixtures thereof.

8. The process of claim 1 wherein said high silicon and sulfur-containing heavy liquid hydrocarbonaceous fuel having a nickel and vanadium-containing ash is a pumpable slurry of petroleum coke in a carrier selected from the group consisting of water, liquid hydrocarbon fuel, and mixtures thereof.

9. The process of claim 1 where in (1) said iron and/or copper-containing additive is introduced into the feed to or the bottoms from a vacuum distillation unit.

10. The process of claim 1 wherein said mixture of iron and/or copper-containing additive and feedstock from (1) has a particle size of ASTM E-11 Standard Sieve Designation in the range of about 212 microns to 38 microns, or below.

11. The process of claim 1 wherein said iron and/or copper-containing additive comprises about 30.0 to 100.0 wt. % of an iron and/or copper compound.

12. The process of claim 1 wherein substantially all of the sulfur in said feedstock is converted into the sulfides of a metal selected from the group consisting of iron, copper, nickel and mixtures thereof, and said sulfide leaves the reaction zone in the slag.

13. The process of claim 1 where included in the iron and/or copper-containing additive in (1) is an additional material comprising a compound including a member of the group of elements consisting of magnesium, chromium, calcium, sodium, manganese, and mixtures thereof.

14. The process of claim 13 wherein said additional materials are provided as compounds in the total amount of about 1.0 to 10.0 wt. % of said additive.

15. The process of claim 13 wherein said compounds are selected from the group consisting of oxides, hydroxides, carbonates, bicarbonates, sulfates, nitrates and mixtures thereof.

16. The process of claim 1 wherein said liquid phase washing agent is present in the amount of about 5.0 to 98 wt. %, (basis total weight of said slag).

17. The process of claim 1 wherein said supplemental free oxygen-containing material is selected from the group consisting of substantially pure oxygen, oxygen-enriched air, and air.

18. The process of claim 1 wherein there is present in said liquid phase washing agent at least one additional element selected from the group consisting of Al, Ca, V, Si, Ti, Mg, Mn, Na, K, and mixtures thereof.

19. A partial oxidation process for the production of gaseous mixtures comprising $H_2$+CO starting with a feedstock comprising a high silicon and sulfur-containing heavy liquid hydrocarbonaceous fuel having a nickel and vanadium-containing ash, and said feedstock includes a minimum of 0.5 wt. % of sulfur and more than about 350 part per million of silicon; and said ash includes a minimum of 5.0 % vanadium, a minimum of 2.0 wt. % of nickel, and a minor amount of less than 5.0 wt. % of the ash of Ca and Na; said process comprising:

(1) mixing together an iron and/or copper-containing additive with said feedstock; wherein the weight ratio of iron and/or copper-containing additive to ash in the reaction zone in (2) is in the range of about 1.0–10.0 to 1.0, and there is at least 10 parts by weight of iron and/or copper for each part by weight of vanadium;

(2) coking said mixture from (1) to produce petroleum coke having a nickel and vanadium-containing ash and having dispersed therein said iron and/or copper-containing additive;

(3) introducing the petroleum coke from (2) into the partial oxidation reaction zone in (4) as a pumpable slurry of petroleum coke in water, liquid hydrocarbonaceous fluid or mixtures thereof, or as substantially dry petroleum coke entrained in a gaseous transport medium;

(4) reacting said petroleum coke at a temperature in the range of about 2200° F. to 3000° F. and at a pressure in the range of about 2 to 250 atmosphere in a free-flow vertical refractory lined partial oxidation reaction zone with a free-oxygen containing gas in the presence of a temperature moderator and in a reducing atmosphere to produce a hot raw effluent gas stream comprising $H_2+CO$ and entrained molten slag; wherein said refractory lining comprises refractory A or a combination of refractory A and refractory B, and refractory A comprises in wt. % $Cr_2O_3$ about 20 to 82, MgO about 5.0 to 45, $Fe_2O_3$ about 0 to 10.5, $Al_2O_3$ about 0 to 6.2, CaO about 0 to 1.0, $SiO_2$ about 0 to 2.5, and others about 0 to 1.3; and refractory B comprises in weight percent: $Cr_2O_3$ about 0 to 40, MgO about 20 to 85, $Fe_2O_3$ about 0 to 16, $Al_2O_3$ about 0 to 9.0, $SiO_2$ about 0 to 2.7; and others about 0 to 1.1; and where in said reaction zone separate portions of the said iron and/or copper-containing additive (i) combine with portions of said iron, nickel, and sulfur to generate a liquid phase washing agent; (ii) combine with a portion of the refractory components, and vanadium, iron, nickel and aluminum to form spinel and oxide lath phases which are washed by said first liquid phase washing agent; and (iii) combine with a portion of said nickel, calcium, silicon, aluminum, magnesium and sodium to generate a liquid oxide-silicate phase that fluxes substantially all of the remaining vanadium and other ash components; and (5) separating nongaseous material from said hot raw effluent gas stream.

20. The process of claim 19, wherein said additive is an iron-containing additive which is elemental iron or iron compounds selected from the group consisting of oxide, sulfide, sulfate, carbonate, cyanide, nitrate; and mixtures thereof.

21. The process of claim 19 wherein said additive is a copper-containing additive which is a copper compound selected from the group consisting of oxide, sulfide, sulfate, hydroxide, carbonate, cyanide, chloride, nitrate and mixtures thereof.

22. The process of claim 19 wherein said mixture of iron and/or copper-containing additive and feedstock from (1) has a particle size of ASTME-11 Standard Sieve Designation in the range of about 212 microns to 38 microns or below.

23. The process of claim 19 wherein said additive is an iron-containing additive that includes an inorganic or organic compound of iron.

24. The process of claim 19 wherein said ash-containing heavy liquid hydrocarbonaceous fuel is a high boiling liquid petroleum feed to or the bottoms from a vacuum tower or a fractionator.

25. The process of claim 19 where in (2) the mixture from (1) at a temperature in the range of about 650° F. to 930° F. is introduced into a delayed coking zone where at a temperature in the range of about 800° F. to 895° F. and a pressure in the range of about 20 to 60 psig uncondensed hydrocarbon effluent vapor and steam are removed overhead and said petroleum coke having a nickel and vanadium-containing additive is removed from the bottom.

26. The process of claim 19 wherein the first liquid phase washing agent is present in the amount of about 5.0 to 98 wt. % (basis total weight of said slag).

27. The process of claim 19 where in (2) the mixture from (1) at a temperature in the range of about 550° F. to 750° F. is introduced into a fluidized bed coking zone where at a temperature in the range of about 1000° F. to 1200° F. and a pressure in the range of about 10 to 20 psig, uncondensed hydrocarbon effluent vapor and steam are removed overhead and said petroleum coke is removed from the bottom.

28. The process of claim 19 where in (5) said nongaseous materials are separated from said hot effluent gas stream by contacting the gas stream from (4) with a water or oil scrubbing medium.

29. The process of claim 19 where included in the iron and/or copper-containing additive in (1) is an additional material selected from the group of elements consisting of magnesium, chromium, calcium, sodium, manganese, and mixtures thereof in the form of compounds.

30. The process of claim 29 wherein said additional material comprises magnesium which is provided as a compound in the total amount of about 1.0 to 10.0 wt. % of the iron and/or copper-containing additive.

31. The process of claim 30 wherein said magnesium compound is an oxide.

32. The process of claim 19 wherein substantially all of the sulfur in said feedstock is converted into the sulfides of iron and/or copper and nickel and said sulfides leave the reaction zone in the slag.

33. The process of claim 19 wherein there is present in said liquid phase washing agent at least one additional element selected from the group consisting of Al, Ca, V, Si, Ti, Mg, Mn, Na, K and mixtures thereof.

34. A process for the production of gaseous mixtures comprising $H_2+CO$ by the partial oxidation of a feedstock comprising a high silicon and sulfur-containing heavy liquid hydrocarbonaceous fuel having a nickel and vanadium-containing ash, or a high-silicon and sulfur-containing petroleum coke having a nickel and vanadium-containing ash, or mixtures thereof; and said feedstock includes a minimum of 0.5 wt. % of sulfur, and more than about 350 parts per million of silicon; and said ash includes a minimum of 5.0 wt. % vanadium, a minimum of 2.0 wt. % of nickel, and a minor amount of Ca and Na of less than about 5 wt. % of the ash, said process comprising:

(1) mixing together an iron and/or copper-containing additive with said feedstock; wherein the weight ratio of iron and/or copper-containing additive to ash in the reaction zone in (2) is in the range of about 1.0–10.0 to 1.0, and there is at least 10 parts by weight of iron and/or copper for each part by weight of vanadium;

(2) reacting said mixture from (1) at a temperature in the range of about 2200° F. to 3000° F. and at a pressure in the range of about 2 to 250 atmosphere in a free-flow vertical refractory lined partial oxidation zone with a free-oxygen containing gas in the presence of a temperature moderator and in a reducing atmosphere to produce a hot raw effluent gas stream comprising $H_2+CO$ and entrained molten slag; wherein oxygen and/or sulfur in the gaseous phase are maintained in the reaction zone at a partial pressure in atmospheres of $6.07 \times 10^{-13}$ and $4.1 \times 10^{-6}$, respectively at a temperature of 2200° F.; and wherein said refractory lining comprises refractory A or a combination of refractory A and refractory B, and refractory A comprises in wt. %; $Cr_2O_3$ about 20 to 82, MgO and 5.0 to 45, $Fe_2O_3$ about 0 to 10.5, $Al_2O_3$ about 0 to 6.2, CaO about 0 to 1.0, $SiO_2$ about 0 to 2.5, and others about 0 to 1.3; and refractory B comprises in weight percent: $Cr_2O_3$ about 0 to 40, MgO about 20 to 85, $Fe_2O_3$ about 0 to 16, $Al_2O_3$ about 0 to 9.0, $SiO_2$ about 0 to 2.7, and others about 0 to 1.1; and where in said reaction zone separate portions of the said iron and/or copper-containing additive (i) combine with portions of said iron, nickel, and sulfur to generate a liquid phase washing agent; (ii) combine with a portion of the refractory components, and vanadium, iron, nickel, and aluminum to form spinel and oxide lath phases which are washed by said liquid phase washing agent; and (iii) combine with a portion of said nickel, calcium, silicon, aluminum, magnesium and sodium to generate a liquid oxide-silicate phase that fluxes substantially all of the remaining vanadium and other ash components; and (3) separating nongaseous materials from said hot raw effluent gas stream.

35. A partial oxidation process for the production of gaseous mixtures comprising $H_2+CO$ starting with a feedstock comprising a high silicon and sulfur-containing heavy liquid hydrocarbonaceous fuel having a nickel and vanadium-containing ash, and said feedstock includes a minimum of 0.5 wt. % of sulfur, and more than about 350 parts per million of silicon; and said ash includes a minimum of 5.0% vanadium, a minimum of of 2.0 wt. % of nickel, and a minor amount of Ca and Na of less than about 5 wt. % of the ash said process comprising:

(1) mixing together an iron and/or copper-containing additive with said feedstock; wherein the weight ratio of iron and/or copper-containing additive to ash in the reaction zone in (2) is in the range of about 1.0–10.0 to 1.0, and there is at least 10 part by weight of vanadium;

(2) coking said mixture from (1) to produce petroleum coke having a nickel and vanadium-containing ash and having dispersed therein said iron and/or copper-containing additive;

(3) introducing the petroleum coke from (2) into the partial oxidation reaction zone in (4) as a pumpable slurry of petroleum coke in water, liquid hydrocarbonaceous fluid or mixtures thereof, or as substantially dry petroleum coke entrained in a gaseous transport medium;

(4) reacting said petroleum coke at a temperature in the range of about 2200° F. to 3000° F. and at a pressure in the range of about 2 to 250 atmosphere in a free-flow vertical refractory lined partial oxidation reaction zone with a free oxygen containing gas in the presence of of a temperature moderator and in a reducing atmosphere to produce a hot raw effluent gas stream comprising $H_2+CO$ and entrained molten slag; wherein oxygen and/or sulfur in the gaseous phase are maintained in the reaction zone at a partial pressure in atmospheres of $6.07 \times 10^{-13}$ and $4.1 \times 10^{-6}$, respectively at a temperature of 2200° F.; and wherein said refractory lining comprises refractory A or a combination of refractory A and refractory B, and refractory A comprises in wt. %: $Cr_2O_3$ about 20 to 82, MgO about 5.0 to 45, $Fe_2O_3$ about 0 to 10.5, $Al_2O_3$ about 0 to 6.2, CaO about 0 to 1.0, $SiO_2$ about 0 to 2.5, and others about 0 to 0 to 1.3; and refractory B comprises in weight percent: $Cr_2O_3$ about 0 to 40, MgO about 20 to 85, $Fe_2O_3$ about 0 to 16, $Al_2O_3$ about 0 to 9.0, $SiO_2$ about 0 to 2.7, and others about 0 to 1.1; and where in said reaction zone separate portions of the said iron and/or copper-containing additive (i) combine with portions of said iron, nickel, and sulfur to generate a liquid phase washing agent; (ii) combine with a portion of the refractory components, and vanadium, iron, nickel, and aluminum to form spinel and oxide lath phases which are washed by said liquid phase washing agent; and (iii) combine with a portion of said nickel, calcium, silicon, aluminum, magnesium and sodium to generate a liquid oxide-silicate phase that fluxes substantially all of the remaining vanadium and other ash components; and (5) separating nongaseous material from said hot raw effluent gas stream.

36. The process of claim 35 wherein said oxygen in the gaseous phase is selected from the group consisting of substantially pure oxygen, oxygen-enriched air, and air; and said sulfur in the gaseous phase is selected from the group consisting of elemental sulfur, $H_2S$, COS and $SO_2$.

37. A process for the production of gaseous mixtures comprising $H_2+CO$ by the partial oxidation of a feedstock comprising a high silicon and sulfur-containing heavy liquid hydrocarbonaceous fuel having a nickel and vanadium containing ash, or a high-silicon and sulfur-containing petroleum coke having a nickel and vanadium-containing ash, or mixtures thereof; and said feedstock includes a minimum of 0.5 wt. % of sulfur, and more than about 350 parts per million of silicon; and said ash includes a minimum of 5.0 wt. % vanadium, a minimum of 2.0 wt. % of nickel, and a minor amount of Ca and Na of less than about 5 wt. % of the ash, said process comprising:

(1) mixing together an iron and/or copper-containing additive with said feedstock; wherein the weight ratio of iron and/or copper-containing additive to ash in the reaction zone in (2) is in the range of about 1.0–10.0 to 1.0, and there is at least 10 parts by weight or iron and/or copper for each part by weight of vanadium;

(2) reacting said mixture from (1) at a temperature in the range of about 2200° F. to 3000° F. and at a pressure in the range of about 2 to 250 atmosphere in a free-flow vertical refractory lined partial oxidation reaction zone with a free-oxygen containing gas in the presence of a temperature moderator and in a reducing atmosphere to produce a hot raw effluent gas stream comprising $H_2+CO$ and entrained molten slag; introducing into said partial oxidation reaction zone sufficient free-oxygen containing gas and/or elemental sulfur or a sulfur-containing material to maintain the equilibrium partial pressure of oxygen in the reaction zone and/or the equilibrium partial pressure of the $S_2$ gas in the reaction zone at a value which is above that calculated in Formulae I and/or II, respectively: wherein:

$$\log P_{(O_2)} = -38.9691 + 0.01744 T°F - 0.00000024 T^{2°}F. \quad\quad I$$

$$\log P_{(S_2)} = -17.3454 + 0.007857 T°F - 0.00000011 T^{2°}F. \quad\quad II$$

and T is the temperature in the partial oxidation reaction zone in the range of about 2100° F. to 3000° F. wherein said refractory lining comprises refractory A or a combination of refractory A and refractory B, and refractory A comprises in wt. %; $Cr_2O_3$ about 20 to 82, MgO about 5.0 to 45, $Fe_2O_3$ about 0 to 10.5, $Al_2O_3$ about 0 to 6.2, CaO about 0 to 1.0, $SiO_2$ about 0 to 2.5, and others about 0 to 1.3; and refractory B comprises in weight percent: $Cr_2O_3$ about 0 to 40, MgO about 20 to 85, $Fe_2O_3$ about 0 to 16, $Al_2O_3$ about 0 to 9.0, $SiO_2$ about 0 to 2.7, and others about 0 to 1.1; and where in said reaction zone separate portions of the said iron and/or copper-containing additive (i) combine with portions of said iron, nickel, and sulfur to generate a liquid phase washing agent; (ii) combine with a portion of the refractory components, vanadium, iron, nickel, and aluminum to form spinel and oxide lath phases which are washed by said first liquid phase washing agent; and (iii) combine with a portion of said nickel, calcium, silicon, aluminum, magnesium and sodium to generate a liquid oxide-silicate phase that fluxes substantially all of the remaining vanadium and other ash components; and (3) separating nongaseous materials from said hot raw effluent gas stream.

38. A partial oxidation process for the production of gaseous mixtures comprising $H_2+CO$ starting with a feedstock comprising a high silicon and sulfur-containing heavy liquid hydrocarbonaceous fuel having a nickel and vanadium-containing ash, and said feedstock includes a minimum of 0.5 wt. % of sulfur and more than about 350 part per million of silicon; and said ash includes a minimum of 5.0% vanadium, a minimum of 2.0 wt. % of nickel, and a minor amount of Ca and Na of less than about 5 wt. % of the ash, said process comprising:

(1) mixing together an iron and/or copper-containing additive with said feedstock; wherein the weight ratio of iron and/or copper-containing additive to ash in the reaction zone in (2) is in the range of about 1.0-10.0 to 1.0, and there is at least 10 parts by weight of iron and/or copper for each part by weight of vanadium;

(2) coking said mixture from (1) to produce petroleum coke having a nickel and vanadium-containing ash and having dispersed therein said iron and/or copper-containing additive;

(3) introducing the petroleum coke from (2) into the partial oxidation reaction zone in (4) as a pumpable slurry of petroleum coke in water, liquid hydrocarbonaceous fluid or mixtures thereof, or as substantially dry petroleum coke entrained in a gaseous transport medium;

(4) reacting said petroleum coke at a temperature in the range of about 2200° F. to 3000° F. and at a pressure in the range of about 2 to 250 atmosphere in a free-flow vertical refractory lined partial oxidation reaction zone with a free-oxygen containing gas in the presence of a temperature moderator and in a reducing atmosphere to produce a hot raw effluent gas stream comprising $H_2+CO$ and entrained molten slag; introducing into said reaction zone sufficient free-oxygen containing gas and/or elemental sulfur or a sulfur-containing material to maintain the equilibrium partial pressure of oxygen in the reaction zone and/or the equilibrium partial pressure of the $S_2$ gas in the reaction zone at a value which is above that calculated in Formulae I and/or II, respectively below: where:

$$\log P_{(O_2)} = -38.9691 + 0.01744 T°F - 0.00000024 T^{2°}F. \quad\quad I$$

$$\log P_{(S_2)} = -17.3454 + 0.007857 T°F.31\ 0.00000011 T^{2°}F. \quad\quad II$$

and T is the temperature in the reaction zone in the range of about 2100° F. to 3000° F.; and wherein said refractory lining comprises refractory A or a combination of refractory A and refractory B, and refractory A comprises in wt. % $Cr_2O_3$ about 20 to 82, MgO about 5.0 to 45, $Fe_2O_3$ about 0 to 10.5, $Al_2O_3$ about 0 to 6.2, CaO about 0 to 1.0, $SiO_2$ about 0 to 2.5, and others about 0 to 1.3; and refractory B comprises in weight percent: $Cr_2O_3$ about 0 to 40, MgO about 20 to 85, $Fe_2O_3$ about 0 to 16, $Al_2O_3$ about 0 to 9.0, $SiO_2$ about 0 to 2.7; and others about 0 to 1.1; and where in said reaction zone separate portions of the said iron and/or copper-containing additive (i) combine with portions of said iron, nickel, and sulfur to generate a liquid phase washing agent; (ii) combine with a portion of the refractory components, vanadium, iron, nickel and aluminum to form spinel and oxide lath phases which are washed by said first liquid phase washing agent; and (iii) combine with a portion of said nickel, calcium, silicon, aluminum, magnesium and sodium to generate a liquid oxide-silicate phase that fluxes substantially all of the remaining vanadium and other ash components; and (5) separating nongaseous material from said hot raw effluent gas stream.

* * * * *